(12) United States Patent
Yamada et al.

(10) Patent No.: US 11,955,826 B2
(45) Date of Patent: Apr. 9, 2024

(54) VEHICLE-MOUNTED NETWORK SYSTEM (71) Applicant: Mazda Motor Corporation, Hiroshima (JP)

(72) Inventors: Sadahisa Yamada, Hiroshima (JP); Yoshimasa Kurokawa, Hiroshima (JP); Tetsuhiro Yamashita, Hiroshima (JP); Masaaki Shimizu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 178 days.

(21) Appl. No.: 17/620,745

(22) PCT Filed: Jun. 15, 2020

(86) PCT No.: PCT/JP2020/023404
§ 371 (c)(1),
(2) Date: Dec. 20, 2021

(87) PCT Pub. No.: WO2021/005974
PCT Pub. Date: Jan. 14, 2021

(65) Prior Publication Data
US 2022/0416555 A1 Dec. 29, 2022

(30) Foreign Application Priority Data
Jul. 9, 2019 (JP) .................................. 2019-127734

(51) Int. Cl.
*H02J 7/00* (2006.01)
*B60R 16/02* (2006.01)
(Continued)

(52) U.S. Cl.
CPC ........ *H02J 7/0063* (2013.01); *B60R 16/0215* (2013.01); *B60R 16/0238* (2013.01); *B60R 16/033* (2013.01)

(58) Field of Classification Search
CPC ............... H02J 7/0063; B60R 16/0215; B60R 16/0238; B60R 16/033
(Continued)

(56) References Cited

U.S. PATENT DOCUMENTS 6,420,799 B1 * 7/2002 Sakamoto ................ H02J 1/06
370/425
2004/0227402 A1 11/2004 Fehr et al.
(Continued)

FOREIGN PATENT DOCUMENTS

DE 102017205176 A1 10/2018
JP 2007-253683 A 10/2007
JP 2016-201740 A 12/2016

OTHER PUBLICATIONS

International Search Report and Written Opinion dated Aug. 11, 2020, received for PCT Application PCT/JP2020/023404, Filed on Jun. 15, 2020, 8 pages including English Translation.

Primary Examiner — Hal Kaplan
(74) Attorney, Agent, or Firm — XSENSUS LLP (57) ABSTRACT Electronic devices include: a first electronic device capable of being always supplied with power; and a second electronic device capable of being supplied with the power through an operation by an occupant. Each of power supply hubs is located near the first electronic device, and connected to a battery or another one of the power supply hubs by one of main power supply lines. Each of the first and second electronic devices is connected to nearby one of the power supply hubs. Each of zone ECUs outputs a control signal to one of power supply ICs so as to distribute, to the first and second electronic devices, the power supplied to one of the power supply hubs by one of the main power supply lines.

8 Claims, 4 Drawing Sheets (51) Int. Cl.
*B60R 16/023* (2006.01)
*B60R 16/033* (2006.01)

(58) Field of Classification Search
USPC .................................................. 307/9.1, 10.1
See application file for complete search history.

(56) References Cited

U.S. PATENT DOCUMENTS

| | | |
|---|---|---|
| 2009/0152943 A1 | 6/2009 | Diab et al. |
| 2017/0008466 A1 | 1/2017 | Kikuchi |
| 2019/0118744 A1* | 4/2019 | Takamatsu .......... B60R 16/0215 |

* cited by examiner

| No. | VEHICLE STATUS | ENVIRONMENT INSIDE/ OUTSIDE VEHICLE | UNUSED ELECTRONIC DEVICES |
|---|---|---|---|
| G1 | TRAVELING FORWARD | — | REARVIEW CAMERAS, REARVIEW RADARS |
| G2 | STOP | IN USE OF AIR CONDITIONER | ELECTRIC POWER WINDOWS |
| G3 | DRIVER SWITCH: OFF | BRIGHT (E.G., DAYTIME) | HEADLAMPS, CLEARANCE LAMPS |

VEHICLE-MOUNTED NETWORK SYSTEM

CROSS-REFERENCE TO RELATED APPLICATIONS

The present application is based on PCT filing PCT/JP2020/023404, filed Jun. 15, 2020, which claims priority to JP 2019-127734, filed Jul. 9, 2019, the entire contents of each are incorporated herein by reference.

TECHNICAL FIELD

The present disclosure belongs to the technical field related to a vehicle-mounted network system.

BACKGROUND ART

In recent years, on-board devices have been significantly motorized and a large number of electronic devices have been arranged on vehicles. Accordingly, configurations of supplying power to the electronic devices are being considered.

For example, Patent Document 1 discloses an on-board communication system including a gateway ECU that relays communications between ECUs of different networks, and waking up only the network including a transmission target ECU to which signals start being transmitted first after all the networks have entered a sleep mode.

CITATION LIST

Patent Document

Patent Document 1: Japanese Unexamined Patent Publication No. 2016-201740

SUMMARY OF THE INVENTION

Technical Problem

With an increase in the number of electronic devices, the number of power supply lines from the battery also increases accordingly. The increase in the power supply lines causes not only the complication of the configuration of the power supply system but also an increase in the power consumption under the influence of the resistances of the power supply lines. According to Patent Document 1, communication lines are divided for each network, but the power supply lines from the power source are not particularly considered.

According to Patent Document 1, unused ECUs are also woken up in the network including the transmission target ECU, which may cause excessive power consumption. There is thus room for improvement in view of reducing the power consumption.

It is an objective of the technique disclosed herein to simplify a configuration of a power supply system of a vehicle and to reduce an increase in power consumption.

SUMMARY OF THE INVENTION

In order to achieve the objective, the technique disclosed herein is directed to a vehicle-mounted network system of a vehicle including a plurality of electronic devices operated by power supplied from a battery. The system includes: a plurality of power supply hubs each arranged in a middle of one of power supply paths between the battery and ones of the electronic devices and connected to the ones of the electronic devices via power supply lines; a plurality of power supply ICs each provided for associated one of the power supply hubs and configured to supply and cut off the power to the ones of the electronic devices connected; and a plurality of power supply controllers each configured to output, to associated one of the power supply ICs, a control signal related to the supply and cut-off of the power to the one of the electronic devices connected. The electronic devices include: a first electronic device capable of being always supplied with the power from the battery; and a second electronic device capable of being supplied with the power from the battery through an operation by an occupant of the vehicle. Each of the power supply hubs is connected to the battery or another one of the power supply hubs by one of main power supply lines. Each of the first and second electronic devices is connected to nearby one of the power supply hubs. Each of the power supply control devices outputs the control signal to the associated one of the power supply ICs so as to distribute, to the first and second electronic devices, the power supplied to the associated one of the power supply hubs by the one of the main power supply lines.

With this configuration, each of the power supply hubs is connected to the battery or another one of the power supply hubs by one of main power supply lines. Each of the first and second electronic devices is connected to nearby one of the power supply hubs. Accordingly, there is no need to extend the power supply line for the second electronic device from the battery or to provide a relay for the second electronic device. In addition, the lengths of the power supply lines extending from the first and second electronic devices to the power supply hubs can be reduced as much as possible. This results in simplification of the configuration of the power supply system. With a decrease in the lengths of the power supply lines, the power consumption also decreases as much as possible which is caused by the electric resistances of the power supply lines.

Each of the power supply controllers switches the supply and cut-off of the power to the first and second electronic devices for each power supply hub. Specifically, since each of the power supply hubs itself is connected to the battery or another one of the power supply hubs, the first electronic device can be always supplied with the power. On the other hand, the supply and cut-off of the power to the second electronic device can be switched by software via associated one of the power supply controllers and associated one of the power supply hubs. Accordingly, the power can be supplied only to one of the first and second electronic devices requiring the power supply. This results in reduction in the power consumption.

The configuration simplifies the configuration of the power supply system of the vehicle and reduces an increase in the power consumption.

The vehicle-mounted network system further includes a central arithmetic unit configured to set one(s) of the electronic devices to be operated in accordance with a scene of the vehicle. Each of the power supply controllers is built in associated one of the power supply hubs, and generates the control signal to be output to the associated one of the power supply ICs upon receipt of a signal from the central arithmetic unit.

With this configuration, since each of the power supply controllers is built in one of the power supply hubs, the configuration of the power supply system can be further simplified.

In the vehicle-mounted network system, some of the second electronic devices are located near one of the power supply hubs and not used in at least one certain scene. They are collectively connected to the one of the power supply hubs by a single power supply line. A scene represents a status of the vehicle and environments inside and outside the vehicle as will be described more below.

In this configuration, the electronic devices that are not used in at least one certain scene are collectively connected to one of the power supply hubs by a single power supply line, which reduces the number of the power supply lines. In addition, being not used in the at least one certain scene, the electronic devices can be controlled more simply by simultaneously cutting off the power supply via the single power supply line.

In the vehicle-mounted network system, the first electronic device includes first electronic devices each connected to associated one of the power supply hubs by an independent individual power supply line.

Specifically, the first electronic devices always supplied with the power and operating include the devices, such as a keyless entry system, always operating; and the devices, such as an anti-theft monitoring camera, not to be operated particularly when an occupant is in the vehicle. The power supply to ones of the first electronic devices not always to be operated can thus be cut off by connecting the ones of the first electronic devices to the associated power supply hubs by the respective individual power supply lines. This reduces an increase in the power consumption.

Advantages of the Invention

As described above, according to the technique disclosed herein, each of the power supply hubs is located near the first electronic device and connected to the battery or another one of the power supply hubs. Each of the first and second electronic devices is connected to nearby one of the power supply hubs. This reduces the number of the power supply lines extending from the battery as much as possible.

Each of the power supply controllers supplies and cuts off the power to the first and second electronic devices by software. This reduces the power consumption.

Accordingly, the power supply system of the vehicle has a simplified configuration with a lower power consumption.

DESCRIPTION OF EMBODIMENTS

Exemplary embodiments will be described in detail below with reference to the drawings.

First Embodiment

Figure 1:
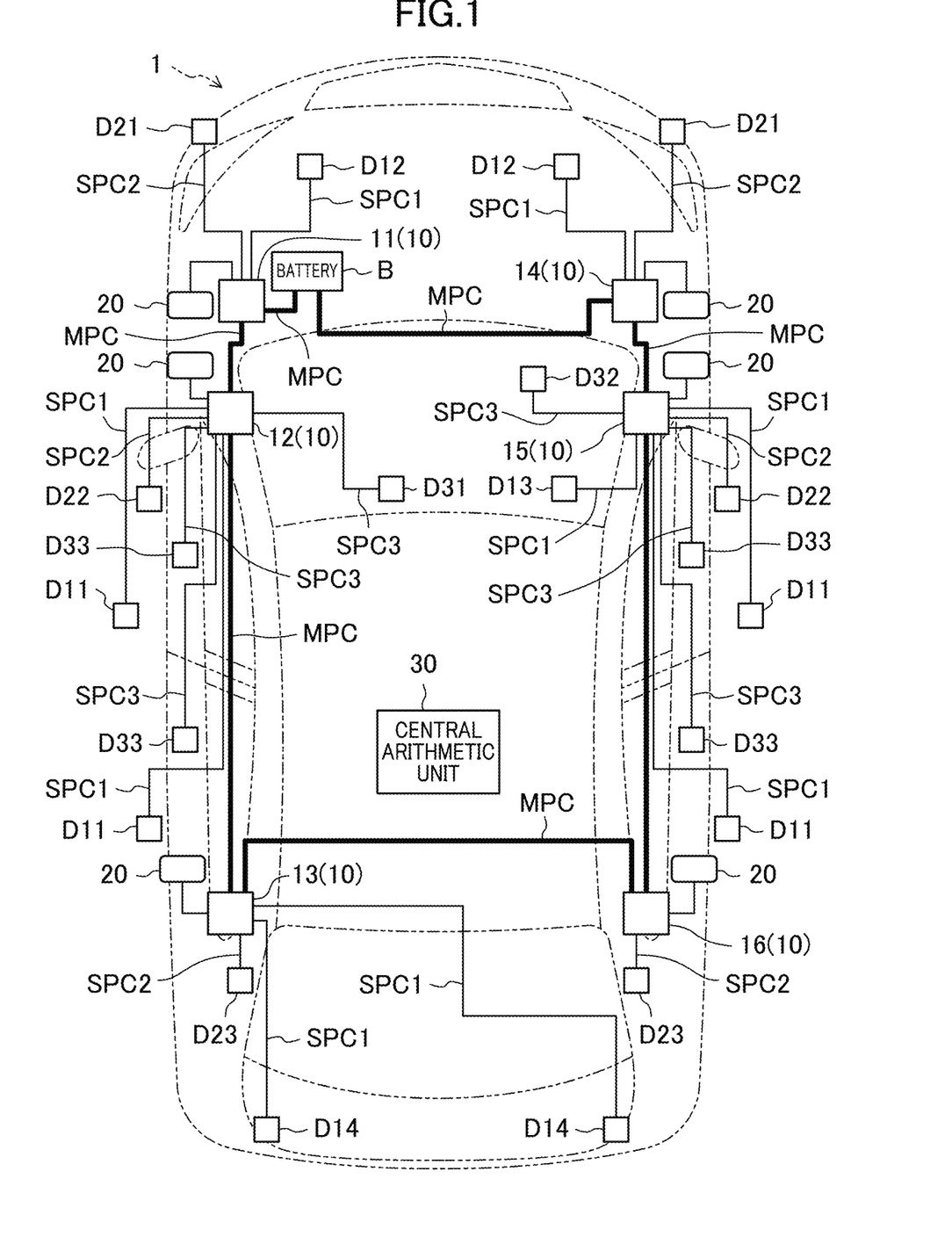
FIG. 1 is a configuration diagram showing a power supply system of a vehicle on which an on-board network according to a first embodiment is mounted.

FIG. 1 shows a power supply system of a vehicle 1 on which an on-board network according to a first embodiment is mounted. The vehicle 1 is a five-door vehicle including four side doors and one rear door.

The vehicle 1 includes a plurality of electronic devices D operated by the power supplied from a battery B. Each of the electronic devices D includes: electronic devices (first electronic devices) capable of being always supplied with the power from the battery; and electronic devices (second electronic devices) capable of being supplied with the power from the battery B through an operation by an occupant of the vehicle 1. In the following description, the electronic devices capable of being always supplied with the power from the battery are referred to as "always powered electronic devices D1". The electronic devices capable of being supplied with the power from the battery B through an operation by an occupant of the vehicle 1 with relatively low power consumption as "accessory electronic devices D2". The electronic devices capable of being supplied with the power from the battery B through an operation by an occupant of the vehicle 1 with relatively high power consumption as "ignition electronic devices D3".

Note that the always powered electronic devices D1 may be described as electronic devices D1$n$, where n is one, two, . . . ; the accessory electronic devices D2 as electronic devices D2$n$, where n is one, two, . . . ; and the ignition electronic devices D3 as electronic devices D3$n$, where n is one, two, . . . . If there is no need to distinguish the electronic devices D1 to D3, these electronic devices are simply referred to as "electronic devices D".

Examples of the always powered electronic devices D1 include keyless entry systems D11, anti-theft monitoring camera devices D12, a burglar alarm device D13, or brake lamps D14. The accessory electronic devices D2 are assumed to be used regardless of the on/off of the engine of the vehicle 1. Examples include headlamps D21, electric mirrors D22, or audio devices D23. The ignition electronic devices D3 are usable even in the off-state of the engine of the vehicle 1 but basically assumed to be used in the on-state of the engine. Examples include an air conditioner D31, an electric power steering system D32, and electric power windows D33. The electronic devices D as a concept includes sensors and actuators for operating the devices, ECUs for controlling the actuators, or other elements.

In the power supply system according to the first embodiment, the vehicle 1 is divided into a plurality of (six in this first embodiment) zones. The on and off of the power supply to the electronic devices D can be controlled in each zone.

Each zone is provided with a power supply hub 10. The power supply hub 10 here functions to distribute the power supplied from the battery B to the electronic devices. The electronic devices D are divided into power supply systems (i.e., a constant power supply, an accessory power supply, and an ignition power supply) in positions closer to the electronic devices D. In the following description, the power supply hub 10 on the front left may be referred to as a "first power supply hub 11", the power supply hub 10 near the front left side door zone as a "second power supply hub 12", the power supply hub 10 on the rear left as a "third power supply hub 13", the power supply hub 10 on the front right as a "fourth power supply hub 14", the power supply hub 10 near the front right side door as a "fifth power supply hub 15", and the power supply hub 10 on the rear right as a "sixth power supply hub 16". If there is no need to distinguish the power supply hubs 11 to 16, these power supply hubs are simply referred to as "power supply hubs 10". At an increase or decrease in the number of zones, the number of the power supply hubs 10 is also increased or decreased accordingly.

Each power supply hub 10 is located in a middle of one of the power supply paths between the battery B and associated ones of the electronic devices D. Each power supply hub 10 is connected to the battery B or a nearby power supply hub 10 by a single main power supply line MPC. Specifically, each of the first and fourth power supply hubs 11 and 14 is connected to the battery B by a main power supply line MPC. The second power supply hub 12 is connected to the first power supply hub 11 by a main power supply line MPC. The third power supply hub 13 is connected to the second power supply hub 12 by a main power supply line MPC. The fifth power supply hub 15 is connected to the fourth power supply hub 14 by a main power supply line MPC. The sixth power supply hub 16 is connected to the fifth power supply hub 15 by a main power supply line MPC. The third and sixth power supply hubs 13 and 16 are connected to each other by a main power supply line MPC. Accordingly, the battery B and the power supply hubs 11 to 16 form a loop-like power supply path.

Each of the power supply hubs 11 to 16 is basically supplied with the power from the battery B through the shorter power supply path. However, at a disconnection of a part of the main power supply line MPC, for example, the power is supplied through another power supply path. For example, the second power supply hub 12 is basically supplied with the power from the battery B via the first power supply hub 11. However, at a disconnection of the main power supply line MPC between the first and second power supply hubs 11 and 12, the power is supplied from the battery B via the fourth, fifth, sixth, and third power supply hubs 14, 15, 16 and 13.

Each power supply hub 10 is located near the associated one of the always powered electronic devices D1 of the vehicle 1. Each power supply hub 10 is connected to nearby one of the always powered electronic devices D1, the accessory electronic devices D2, and the ignition electronic devices D3 by associated one of power supply lines SPC1 to SPC3, respectively.

The main power supply lines MPC and the power supply lines SPC only need to supply the power and may be wire harnesses, for example.

As will be described in detail later, each of the power supply hubs 10 includes a plurality of power supply ICs 50 (see FIG. 2) each for supplying and cutting off the power to connected ones of the electronic devices D.

Each power supply hub 10 is connected to associated one of the zone ECUs 20. The zone ECUs 20 receive control signals from a central arithmetic unit 30 that controls the vehicle 1 as a whole. The central arithmetic unit 30 is connected to each zone ECU 20 by a communication wire.

The central arithmetic unit 30 sets the electronic devices D to be operated in accordance with the scenes of the vehicle 1. Upon receipt of the control signals from the central arithmetic unit 30, each zone ECU 20 outputs control signals related to the supply and cut-off of the power to associated ones of the electronic devices D to associated one of the power supply hubs 10 (to be exact, associated one of the power supply ICs described later). Each zone ECU 20 functions to manage and control associated ones of the electronic devices D. For example, the zone ECUs 20 receive the results of detection by various sensors (e.g., a vehicle speed sensor or a vehicle interior temperature sensor) to use the results of detection in processing in the own units or to transmit information to the central arithmetic unit 30.

Figure 2:
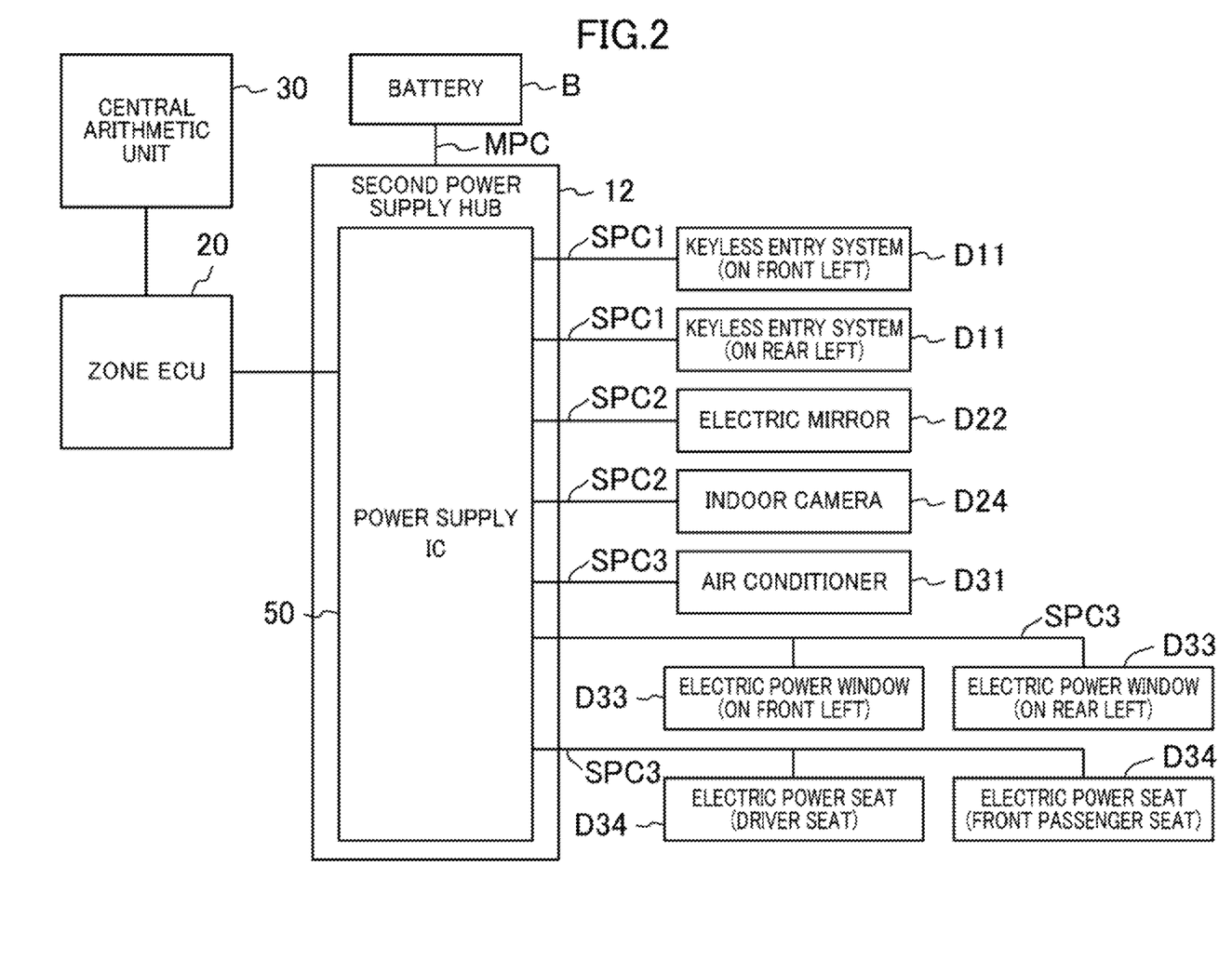
FIG. 2 is a block diagram showing an example of a power supply topology near a front left side door.

FIG. 2 shows an example of a power supply topology in the zone near the front left side door, that is, the zone in which the second power supply hub 12 is located. In the first embodiment, the second power supply hub 12 is connected to a mechanism of the keyless entry system D11 for locking the front left side door, a mechanism of the keyless entry system D11 for locking the rear left side door, the left electric mirror D22, indoor cameras D24, the air conditioner D31, the electric power window D33 of the front left side door, the electric power window D33 of the rear left side door, an electric power seat D34 as a driver seat, and an electric power seat D34 as a front passenger seat. The electronic devices D named here are examples. Connections of other electronic devices D to the second power supply hub 12 are not excluded.

As shown in FIG. 2, the power supply IC 50 is built in the second power supply hub 12. The power supply IC 50 is electrically connected to the battery B via the main power supply line MPC. The power supply IC 50 is electrically connected to the electronic devices D connected to the second power supply hub 12 via the power supply lines SPC1 to SPC3. The power supply IC 50 is supplied with the power by the battery B through the main power supply line MPC. The power is supplied from the battery B to the second power supply hub 12 once unchanged. After that, the power from the battery B is distributed via the power supply IC 50 of the second power supply hub 12 to the always powered electronic devices D1 (the two keyless entry systems D11 here), the accessory electronic devices D2 (the electric mirrors D22 and the indoor cameras D24 here), and the ignition electronic devices D3 (the air conditioner D31, the two electric power windows D33, and the electric power seats D34 here).

Specifically, the power supply IC 50 includes a plurality of switch circuits and a plurality of DC-DC converters. The switch circuits connect (turn on) and disconnect (turn off) the power transmission paths between the battery B and the electronic devices D. The DC-DC converters adjust the voltage of the battery B. Upon receipt of control signals (hereinafter referred to as "ON signals") for turning on the switch circuits from the zone ECU 20, the power supply IC 50 turns on the switch circuits associated with the ON signals. For example, upon receipt of an ON signal for the electric mirror D22 from the zone ECU 20, the power supply IC 50 turns on the switch circuit associated with the electric mirror D22 to supply the power to the electric mirror D22.

With respect to the accessory electronic devices D2, the central arithmetic unit 30 outputs control signals to the zone ECU 20 at a satisfaction of two conditions so as to cause the zone ECU 20 to output ON signals to the power supply IC 50. One of the two conditions is, for example, that the driver of the vehicle 1 turns the key inserted into the key cylinder to the accessory, ON, or start position. The other of the two conditions is, for example, that an operation switch of the accessory electronic devices D2 is pressed with the one condition satisfied.

With respect to the ignition electronic devices D3, the central arithmetic unit 30 outputs control signals to the zone ECU 20 at a satisfaction of two conditions so as to cause the zone ECU 20 to output ON signals to the power supply IC 50. One of the two conditions is, for example, that the driver of the vehicle 1 turns the key inserted into the key cylinder to the ON or start position. The other of the two conditions is, for example, that a control switch of the ignition electronic devices D3 is pressed with the one condition satisfied.

Here, as shown in FIG. 2, in the first embodiment, each always powered electronic device D1 is connected to the second power supply hub 12 by associated one of the individual power supply lines SPC1. On the other hand, some ignition electronic devices D3 are collectively connected to the second power supply hub 12 by a single power supply line SPC3. Specifically, some of the ignition electronic devices D3 unused in common in a scene are collectively connected to the second power supply hub 12 by the single power supply line SPC3. In addition, some of the accessory electronic devices D2 unused in common in some a scene are collectively connected to the second power supply hub 12 by a single power supply line SPC2. "Some of the ignition electronic devices D3 unused in common in a scene" are, for example, the front and rear electric power windows D33 or the electric power seats D34 as the driver and front passenger seats.

Figure 3:
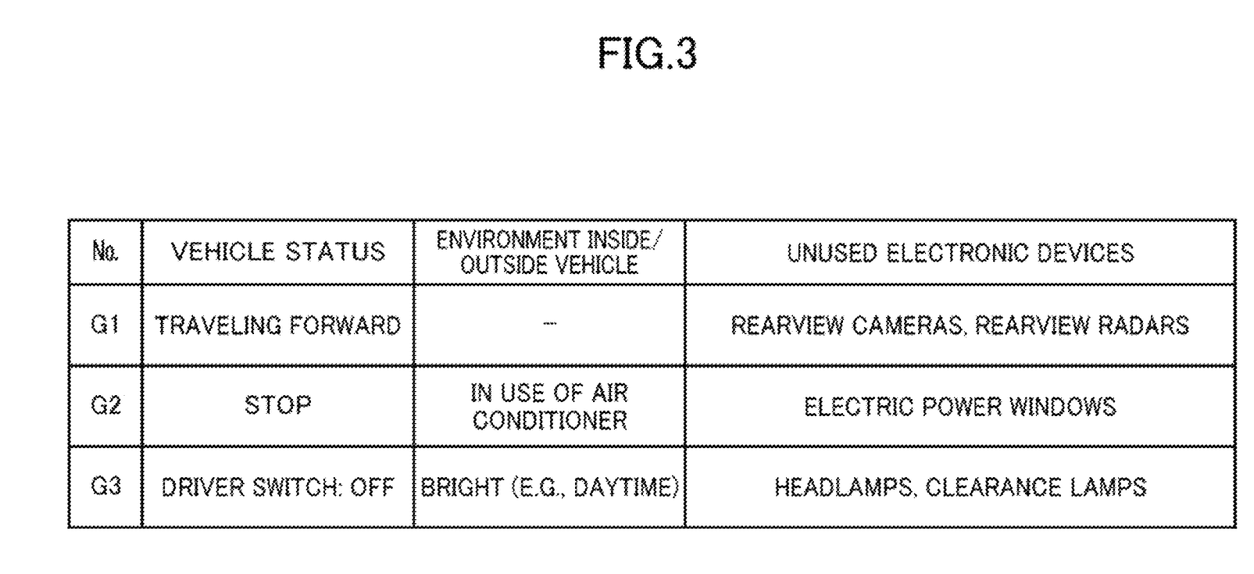
FIG. 3 is a table showing an example of unused electronic devices in scenes.

FIG. 3 illustrates the electronic devices D unused in common in scenes. FIG. 3 shows not only the electronic devices D connected to the second power supply hub 12 but also those connected to other power supply hubs 10.

For example, a group G1 in FIG. 3 is a group of the electronic devices unused while the vehicle 1 "travel[s] forward". This group G1 includes, for example, rearview cameras and rearview radars, and the electric power seats D34 as the driver and front passenger seats. A group G2 is a group of the electronic devices unused while the vehicle 1 "park[s]" and "in use of air conditioner". The group G2 includes the electric power windows D33. A group G3 is the group of the electronic devices unused when the "driver switch" of the vehicle 1 is "off" and the outside of the vehicle is "bright" as in the daytime. The group G3 includes, for example, headlamps D21 and clearance lamps.

The scenes of the vehicle 1 may be determined based on the information obtained by, for example, (1) a plurality of out-of vehicle cameras, (2) the plurality of radars, (3) a position sensor (not shown) (4) a vehicle status sensor (not shown), and (5) an occupant status sensor. The cameras are arranged on the body or other parts of the vehicle 1 and capture images of the vehicle external environment. The radars are arranged on the body or other parts of the vehicle 1 and detect objects, for example, outside the vehicle. The position sensor detects the position of the vehicle 1 (i.e., obtains vehicle position information) utilizing a global positioning system (GPS). The vehicle status sensor includes outputs of sensors such as a vehicle speed sensor, an acceleration sensor, and a yaw rate sensor, detecting the behavior of the vehicle, and obtains the information on the conditions of the vehicle 1. The occupant status sensor includes the indoor cameras D24, for example, and obtains the information on the conditions of an occupant(s) of the vehicle 1. While the determination on the scene is mainly executed by the central arithmetic unit 30, some of the scenes may be determined by each zone ECU 20 independently.

In the first embodiment, the electronic devices D unused in common in a scene are basically connected to a common power supply hub 10. For example, as shown in FIG. 1, the electric power window D33 of the side door on the rear left of the vehicle is closer to the third power supply hub 13 than to the second power supply hub 12. However, in the first embodiment, the electric power window D33 of the side door on the rear left of the vehicle is connected to the second power supply hub 12. With respect to the brake lamps D14, the brake lamp D14 on the right of the vehicle is closer to the sixth power supply hub 16. However, in the first embodiment, the brake lamp D14 on the left of the vehicle is also connected, like the brake lamp D14 on the right of the vehicle, to the third power supply hub 13. This aims to simplify the control of the power supply.

On the other hand, as described above, the always powered electronic devices D1 are connected to the second power supply hub 12 via the individual power supply lines SPC1. Accordingly, the power supply to the always powered electronic devices D1 can be cut off as appropriate in accordance with the scene of the vehicle 1. For examples, the anti-theft monitoring camera devices D12 and the burglar alarm device D13 are the always powered electronic devices D1 but are not always to be operated particularly in the scene where the vehicle 1 stops with an occupant. In this scene, the power supply to the anti-theft monitoring camera devices D12 and the burglar alarm device D13 is cut off. This reduces the power consumption.

Here, if a plurality of electronic devices D are mounted on the vehicle 1 as in the first embodiment, the battery B and the electronic devices D have been typically connected by a plurality of wires and relays. In the background art, the power supply system of the vehicle have become complicated every time when the number of electronic devices D increases.

By contrast, in the first embodiment, the plurality of power supply hubs 10 are arranged near the always powered electronic devices D1. Each power supply hub 10 is connected to the battery B or another power supply hub 10 by one of the main power supply lines MPC. Each of the accessory and ignition electronic devices D2 and D3 is connected to a nearby power supply hub 10. Accordingly, there is no need to extend the power supply lines for the accessory and ignition electronic devices D2 and D3 from the battery B or to provide relays. In addition, the lengths of the power supply lines extending from the electronic devices D to the power supply hubs 10 can be reduced as much as possible. This results in simplification of the configuration of the power supply system. With a decrease in the lengths of the power supply lines, the power consumption also decreases as much as possible which is caused by the electric resistances of the power supply lines.

Since each of the power supply hubs 10 itself is connected to the battery B or another one of the power supply hubs 10, the always powered electronic devices D1 can be always supplied with the power. On the other hand, the supply and cut-off of the power to the accessory and ignition electronic devices D2 and D3 can be switched by software via associated one of the zone ECUs 20 and associated one of the power supply hubs 10. Accordingly, the power can be supplied only to the electronic devices D of the always powered electronic devices D1, the accessory electronic devices D2, and the ignition electronic devices D3 requiring the power supply. This results in reduction in the power consumption.

In the first embodiment, some of the accessory and ignition electronic devices D2 and D3 located near one of the power supply hubs 10 and unused in common in a scene are collectively connected to the power supply hub 10 by a single power supply line SPC2 or SPC3. This reduces the number of the power supply lines SPC2 and SPC3. In addition, being unused in common in the scene, the electronic devices D2 and D3 are controlled more simply by simultaneously cutting off the power supply.

In the first embodiment, each always powered electronic device D1 is connected to associated one of the power supply hubs 10 by an independent individual power supply line SPC1. Specifically, the always powered electronic devices D1 include the devices, such as the keyless entry systems D11, always operating; and the devices, such as the anti-theft monitoring camera devices D12, not to be operated particularly when an occupant is in the vehicle. The power supply to ones of the always powered electronic devices D1 to be not always operated can thus be cut off as appropriate by connecting the ones of the always powered electronic devices D1 to the associated power supply hubs 10 by the respective individual power supply lines SPC1. This reduces an increase in the power consumption. Note that only ones of the always powered electronic devices D1 capable of cutting off the power supply may be connected to the power supply hubs 10 by the individual power supply lines SPC1, whereas the other always powered electronic devices D1 may be collectively connected to the power supply hubs 10 by a single power supply line.

Second Embodiment

Now, a second embodiment will be described in detail with reference to the drawings. Note that the same reference characters as those in the first embodiment are used to represent equivalent elements, and the detailed explanation thereof will be omitted.

Figure 4:
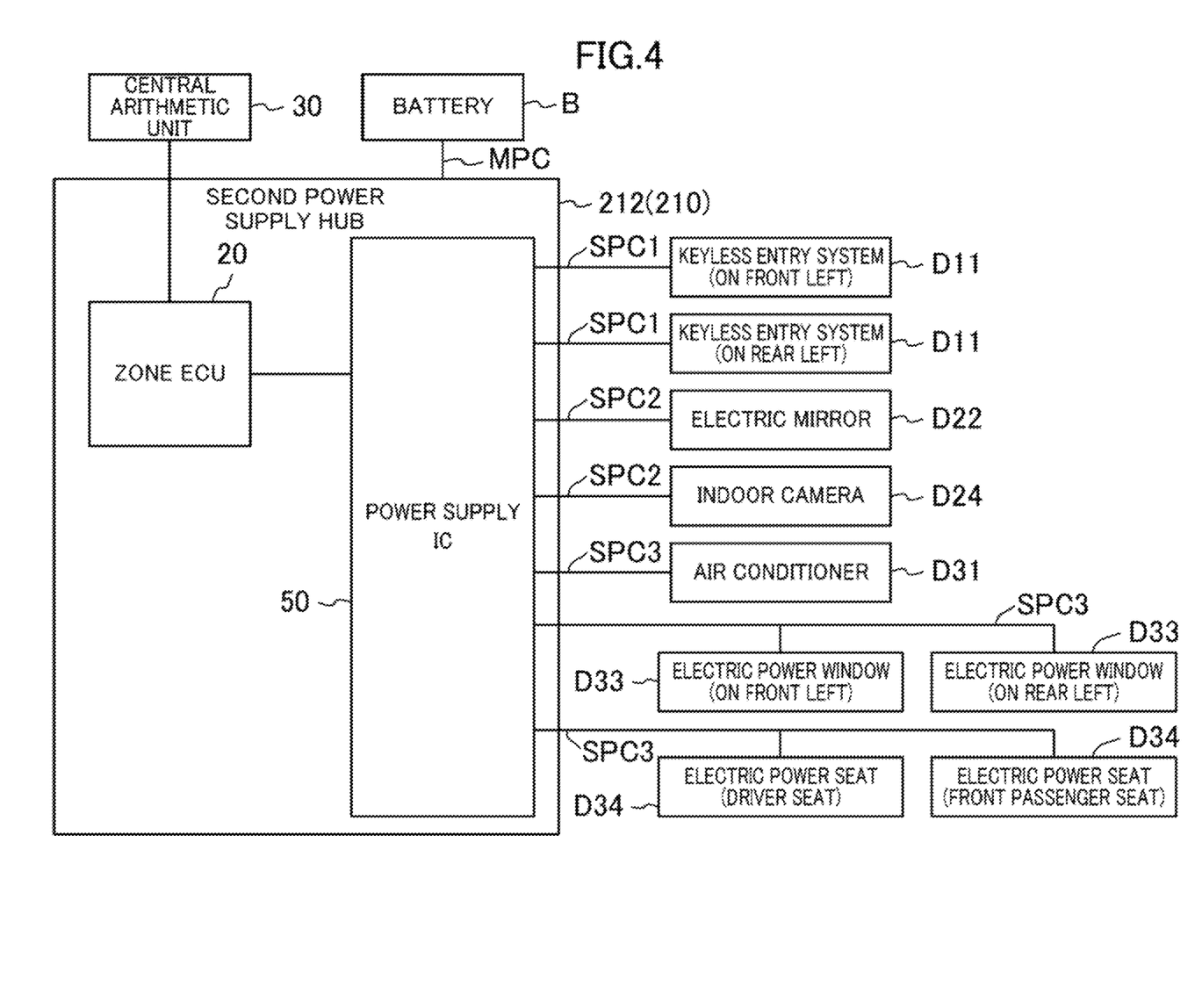
FIG. 4 is a block diagram showing an example of a power supply topology of a front left zone of the vehicle on which an on-board network according to a second embodiment is mounted.

In the on-board network according to the second embodiment, a power supply hub 210 has a different configuration from the power supply hub 210 in the first embodiment. Specifically, as shown in FIG. 4, the on-board network according to the second embodiment is different from that in the first embodiment in that the zone ECU 20 is built in the power supply hub 210 (i.e., a second power supply hub 212 in FIG. 4). In this manner, the zone ECU 20 built in the power supply hub 210 reduces the length of the communication wire between the zone ECU 20 and the power supply IC 50 as much as possible, which further simplifies the configuration of the power supply system.

In the second embodiment as well, the supply and cut-off of the power to the accessory and ignition electronic devices D2 and D3 can be switched by software via associated one of the zone ECU 20 and associated one of the power supply hubs 10. Accordingly, the power can be supplied only to the electronic devices D of the always powered electronic devices D1, the accessory electronic devices D2, and the ignition electronic devices D3 requiring the power supply. This reduces the power consumption.

Other Embodiments

The present disclosure is not limited to the embodiments described above, and may be modified within the scope of the claims.

For example, in the embodiment described above, some of the accessory and ignition electronic devices D2 and D3 unused in common in a scene are collectively connected to the power supply hub 10 by a single power supply line SPC2 or SPC3. The configuration is not limited thereto. The accessory and ignition electronic devices D2 and D3 may be connected to the power supply hubs 10 and individual power supply lines SPC2 or SPC3, respectively. In this case, for example, a table as shown in FIG. 3 is stored in advance in a memory section (not shown) of the zone ECU 20 and referred to by the zone ECU 20 to generate the ON signals. Accordingly, the unused accessory and ignition electronic devices D2 and D3 can be controlled collectively.

The embodiments described above are merely examples in nature, and the scope of the present disclosure should not be interpreted in a limited manner. The scope of the present disclosure is defined by the appended claims, and all variations and modifications belonging to a range equivalent to the range of the claims are within the scope of the present disclosure.

INDUSTRIAL APPLICABILITY

The technique disclosed herein is useful as an on-board network system of a vehicle including a plurality of electronic devices operated by the power supplied from a battery.

DESCRIPTION OF REFERENCE CHARACTERS

1 Vehicle
10 Power Supply Hub
20 Zone ECU (Power Supply Controller)
30 Central Arithmetic Unit
50 Power Supply IC
D Electronic Device
D1 Always Powered Electronic Device (First Electronic Device)
D2 Accessory Electronic Device (Second Electronic Device)
D3 Ignition Electronic Device (Second Electronic Device)
MPC Main Power Supply Line
SPC1 Power Supply Line
SPC2 Power Supply Line
SPC3 Power Supply Line

The invention claimed is:

1. A vehicle-mounted network system including a plurality of electronic devices operated by power supplied from a battery, the system comprising:
    a plurality of power supply hubs each arranged in a middle of one of power supply paths between the battery and ones of the electronic devices and connected to the ones of the electronic devices via power supply lines;
    a plurality of power supply ICs each provided for an associated one of the power supply hubs and configured to supply and cut off the power to the ones of the electronic devices connected; and
    a plurality of power supply control circuits each configured to output, to an associated one of the power supply ICs, a control signal that causes the associated one of the power supply ICs to supply and cut-off the power to the ones of the electronic devices connected, wherein
    the electronic devices include
        first electronic devices capable of being always supplied with the power from the battery, and
        second electronic devices capable of being supplied with the power from the battery through an operation by an occupant of the vehicle;
    each of the power supply hubs is connected to the battery or another one of the power supply hubs by one of main power supply lines;
    each of the first and second electronic devices is connected to one of the power supply hubs; and
    each of the power supply control circuits is configured to output the control signal to the associated one of the power supply ICs and cause the associated one of the power supply ICs to distribute, to the first and second electronic devices, the power supplied to the associated one of the power supply hubs via the one of the main power supply lines.

2. The vehicle-mounted network system of claim 1, further comprising:
    central arithmetic circuitry configured to set at least one of the electronic devices to be operated in accordance with a scene of the vehicle, the scene representing a status of the vehicle and environments inside and outside the vehicle, wherein each of the power supply control circuits is built in an associated one of the power supply hubs, and generates the control signal to be output to the associated one of the power supply ICs upon receipt of a signal from the central arithmetic circuitry.

3. The vehicle-mounted network system of claim 2, wherein those of the second electronic devices that are located near one of the power supply hubs and that are not used in at least one scene are collectively connected to the one of the power supply hubs by a single power supply line.

4. The vehicle-mounted network system of claim 3, wherein the first electronic devices are each connected to an associated one of the power supply hubs by an independent individual power supply line.

5. The vehicle-mounted network system of claim 2, wherein the first electronic devices are each connected to an associated one of the power supply hubs by an independent individual power supply line.

6. The vehicle-mounted network system of claim 1, wherein those of the second electronic devices that are located near one of the power supply hubs and that are not used in at least one scene are collectively connected to the one of the power supply hubs by a single power supply line, the scene representing a status of the vehicle and environments inside and outside the vehicle.

7. The vehicle-mounted network system of claim 6, wherein the first electronic devices are each connected to an associated one of the power supply hubs by an independent individual power supply line.

8. The vehicle-mounted network system of claim 1, wherein the first electronic devices are each connected to an associated one of the power supply hubs by an independent individual power supply line.

* * * * *